O. W. BOYEA.
PROPELLER FOR AIRPLANES.
APPLICATION FILED SEPT. 26, 1918.

1,317,125.

Patented Sept. 23, 1919.

WITNESSES
Arthur Frisch

INVENTOR
O. W. BOYEA
BY
ATTORNEYS

UNITED STATES PATENT OFFICE.

OVILA W. BOYEA, OF BARRE, VERMONT.

PROPELLER FOR AIRPLANES.

1,317,125. Specification of Letters Patent. Patented Sept. 23, 1919.

Application filed September 26, 1918. Serial No. 255,805.

*To all whom it may concern:*

Be it known that I, OVILA W. BOYEA, a citizen of the United States, and a resident of Barre, in the county of Washington and State of Vermont, have invented a new and Improved Propeller for Airplanes, of which the following is a full, clear, and exact description.

Among the principal objects which the present invention has in view are: to vary the operating angle of the blades of a propeller of the character mentioned at will; to provide a mounting for holding said blades in operating position adapted to accommodate the independent movement of said blades, and to simplify the construction of said mounting.

Drawings.

Figure 1:
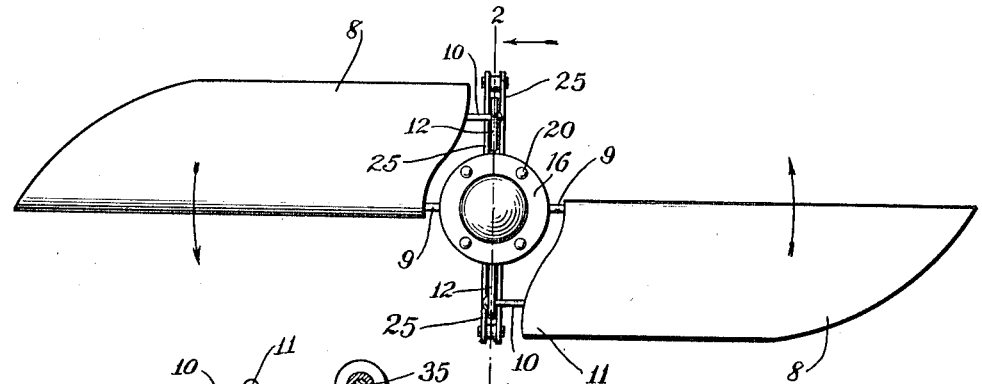
Figure 1 is an end elevation of a propeller shaft and propeller blades therefor constructed and arranged in accordance with the present invention.

Description.

As seen in the drawings, the propeller blades 8 have each a pivot shaft 9 and an engaging rod 10. The rods 10 are disposed adjacent the following edge of each of the blades. The shafts 9 and rods 10 are permanently and fixedly incorporated in the structure of the blades. To facilitate the connection and to relatively shorten the rods 10, each of the blades has a lower extension 11, which in service is juxtaposed to the end of one of the links 12 by means of which the said blades are swung on the axes of the shafts 9.

Figure 3:
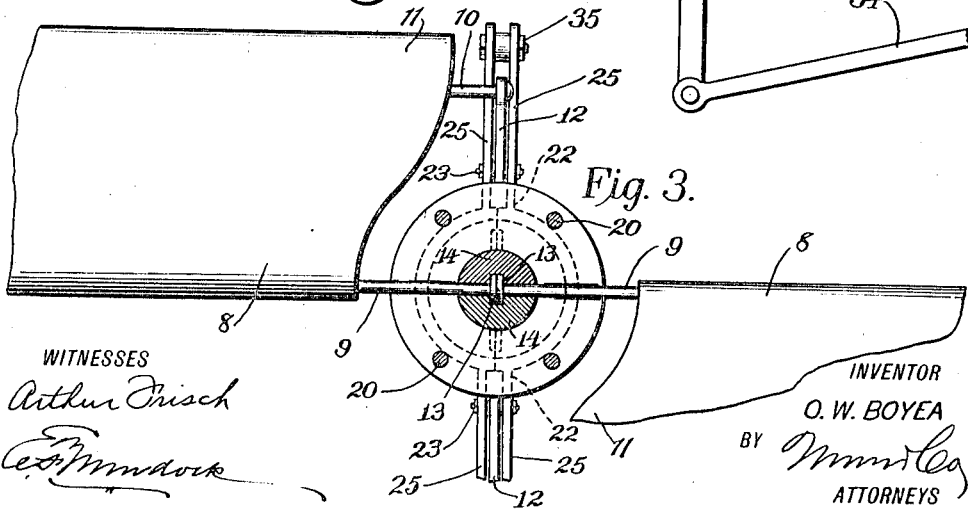
Fig. 3 is a cross section of the end of the propeller shaft, the section being taken as on the line 3—3 in Fig. 2.

As shown best in Fig. 3 of the drawings, each shaft 9 has a head 13. The heads 13 of the two shafts are abutted. The abutment of the shafts forms a convenient inner bearing for said shafts and provides means for retaining the shafts and blades connected therewith in pockets formed in the semi-circular half sections 14, which form the core or filling for the cap 15. The cap 15 is slipped over the core formed by the sections 14, and has a bolting flange 16, which corresponds with the bolting flange 17 of the head block 18 fixedly mounted on the driving shaft 19. The cap 15 is permanently and rigidly secured to the head block 18, by the bolts 20.

Figure 2:
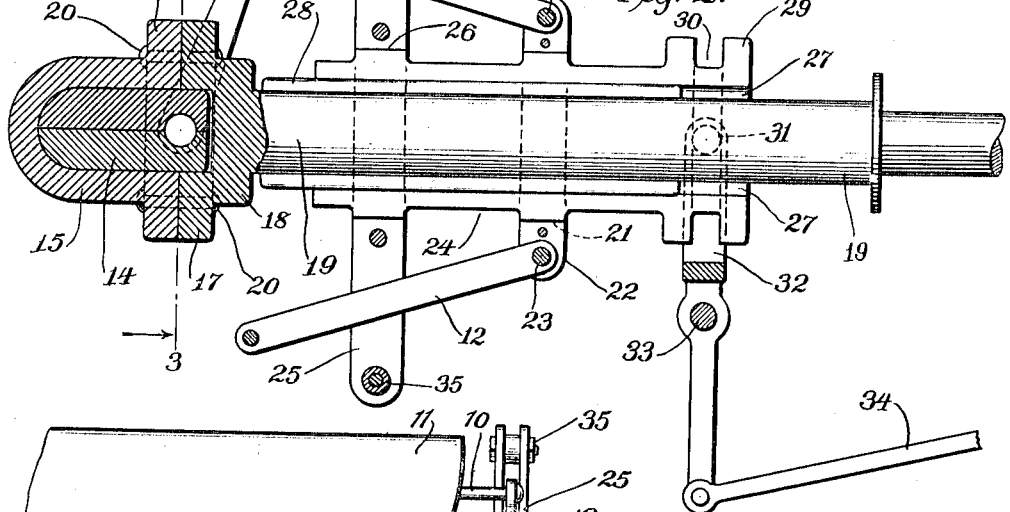
Fig. 2 is a longitudinal section on an enlarged scale, the section being taken as on the line 2—2 in Fig. 1.

The links 12 are permanently secured between lugs 22, by stay bolts 23 which clamp the sides of the sleeve 24 in service. The bolts 23 also serve as pivots for the links 12. The links 12 are guided by the arms 25, which are mounted on the sleeve 24 in paired relation, each pair of the arms 25 having spacing bolts 35 for holding said arms in spaced relation. As shown best in Fig. 2 of the drawings, the section of the sleeve 24 forms keyways 27 in which splines 28 rest.

The sleeve 24 has at the inner end thereof a yoke collar 29 within the groove 30 whereof extends yoke pins 31 of a rocking yoke 32. The yoke 32 is pivoted on a shaft 33 suitably mounted in the frame of an aeroplane and the free end of the said yoke being attached to a connecting rod 34. whereby the yoke is rocked as the aviator desires to change the angle of incidence of the blades 8.

It will be noted that the sections 14 and sleeve 24 are formed in halves adapted to be united when installing the same in service. By this means, it will be understood that the blades 8 and parts connected therewith may be installed or removed at will from the shaft 19 without inconvenience and without requiring the knocking down of other parts of the machine with which they are associated.

Claims.

1. A propeller as characterized comprising a plurality of blades; a plurality of pivot shafts for said blades; a propeller shaft; and means for mounting said blades on said propeller shaft, said means embodying a head block, a bolting cap, means for rigidly securing said cap and head block in service relation, and split sockets within said cap for pivotally holding said pivot shafts.

2. A propeller as characterized comprising a plurality of blades; a plurality of pivot shafts for said blades, each shaft having at the inner end thereof laterally extended heads; a propeller shaft; and means for mounting said blades on said propeller shaft, said means embodying a head block, a bolting cap, means for rigidly securing said cap and head block in service relation, and split sockets within said cap for pivotally holding said pivot shafts and said heads thereof.

3. A propeller as characterized comprising a plurality of blades; a plurality of pivot shafts for said blades; a propeller shaft; and means for mounting said blades on said propeller shaft, said means embodying a head block, a bolting cap, means for rigidly securing said cap and head block in service relation, and a plurality of solid filling sections for said cap, each of said sections having a sectional socket formed therein for engaging said pivot shafts.

4. A propeller as characterized comprising a plurality of blades; a plurality of pivot shafts for said blades; a propeller shaft; means for mounting said blades on said propeller shaft, said means embodying a head block, a bolting cap, means for rigidly securing said cap and head block in service relation, and a plurality of solid filling sections for said cap, each of said sections having a sectional socket formed therein for engaging said pivot shafts; and means operatively connecting with said blades at points removed from the pivot centers thereof for swinging said blades on said pivot centers.

5. A propeller as characterized comprising a plurality of blades; a plurality of pivot shafts for said blades; a propeller shaft; means for mounting said blades on said propeller shaft, said means embodying a head block, a bolting cap, means for rigidly securing said cap and head block in service relation, and a plurality of solid filling sections for said cap, each of said sections having a sectional socket formed therein for engaging said pivot shafts; and means operatively connecting with said blades at points removed from the pivot centers thereof, for swinging said blades on said pivot centers, said means embodying a sleeve slidably mounted on said propeller shaft, links pivotally connecting said sleeve and said blades, and a controlling mechanism extended to the operating station of the aviator for shifting said sleeve.

6. A propeller as characterized comprising a plurality of blades; a plurality of pivot shafts for said blades; a propeller shaft; means for mounting said blades on said propeller shaft, said means embodying a head block, a bolting cap, means for rigidly securing said cap and head block in service relation, and a plurality of solid filling sections for said cap, each of said sections having a sectional socket formed therein for engaging said pivot shafts; means operatively connecting with said blades at points removed from the pivot centers thereof for swinging said blades on said pivot centers, said means embodying a sleeve slidably mounted on said propeller shaft, a plurality of split collar sections adapted for clamping said sleeve, pivot members held between said sections, and a plurality of links connecting said pivot members and said blades; and means mounted on said sleeve for guiding said links in the expansion and contraction thereof.

7. A propeller as characterized comprising a plurality of blades; a plurality of pivot shafts for said blades; a propeller shaft; means for mounting said blades on said propeller shaft, said means embodying a head block, a bolting cap, means for rigidly securing said cap and head block in service relation, a plurality of solid filling sections for said cap, each of said sections having a sectional socket formed therein for engaging said pivot shafts; means operatively connecting with said blades at points removed from the pivot centers thereof for swinging said blades on said pivot centers, said means embodying a sleeve slidably mounted on said propeller shaft, a plurality of split collar sections adapted for clamping said sleeve, pivot members held between said sections, and a plurality of links connecting said pivot members and said blades; and a plurality of split collar sections having guide arms expanded radially therefrom in opposite directions for engaging said links.

OVILA W. BOYEA.